(12) United States Patent
Srinivas et al.

(10) Patent No.: US 8,588,152 B1
(45) Date of Patent: Nov. 19, 2013

(54) USING THE REVERSE ACTIVITY BIT (RAB) TO DYNAMICALLY CONFIGURE PARAMETERS OF THE EV-DO DATA RATE CONTROL (DRC) CHANNEL

(75) Inventors: Shilpa Kowdley Srinivas, Herndon, VA (US); Hemanth Balaji Pawar, Herndon, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 1073 days.

(21) Appl. No.: 12/566,227

(22) Filed: Sep. 24, 2009

(51) Int. Cl.
   - *H04B 7/216* (2006.01)
   - *H04B 7/00* (2006.01)
   - *H04W 4/00* (2009.01)
   - *H04W 72/00* (2009.01)

(52) U.S. Cl.
   USPC ........... 370/329; 370/335; 370/338; 370/342; 455/450; 455/464; 455/509; 455/522

(58) Field of Classification Search
   USPC ........................................................ 370/329
   See application file for complete search history.

(56) References Cited

U.S. PATENT DOCUMENTS

| | | | |
|---|---|---|---|
| 2002/0021692 A1* | 2/2002 | Huh et al. ...................... | 370/352 |
| 2002/0039355 A1* | 4/2002 | Yun et al. ...................... | 370/318 |
| 2002/0126641 A1* | 9/2002 | Bender .......................... | 370/337 |
| 2002/0155835 A1* | 10/2002 | Pankaj et al. ................. | 455/439 |
| 2003/0083090 A1* | 5/2003 | Huh et al. ...................... | 455/423 |
| 2003/0198204 A1* | 10/2003 | Taneja et al. .................. | 370/332 |
| 2003/0223393 A1* | 12/2003 | Lee ................................ | 370/335 |
| 2004/0179480 A1* | 9/2004 | Attar et al. .................... | 370/252 |
| 2004/0196802 A1* | 10/2004 | Bae et al. ....................... | 370/328 |
| 2004/0198404 A1* | 10/2004 | Attar et al. .................... | 455/522 |
| 2004/0203809 A1* | 10/2004 | Au et al. ........................ | 455/450 |
| 2005/0026624 A1* | 2/2005 | Gandhi et al. ................. | 455/453 |
| 2005/0111397 A1* | 5/2005 | Attar et al. .................... | 370/319 |
| 2005/0169295 A1* | 8/2005 | Yun et al. ...................... | 370/437 |
| 2005/0192042 A1* | 9/2005 | Au et al. ........................ | 455/522 |
| 2006/0176881 A1* | 8/2006 | Ma et al. ....................... | 370/392 |
| 2006/0203779 A1* | 9/2006 | Attar et al. .................... | 370/335 |
| 2006/0211442 A1* | 9/2006 | Jung et al. ..................... | 455/522 |
| 2007/0015476 A1* | 1/2007 | Akbar Attar et al. ....... | 455/127.1 |
| 2007/0019589 A1* | 1/2007 | Attar et al. .................... | 370/335 |
| 2007/0036121 A1* | 2/2007 | Cherian et al. ................ | 370/342 |
| 2007/0042780 A1* | 2/2007 | Attar et al. .................... | 455/445 |

(Continued)

OTHER PUBLICATIONS

Yeo et al, A Markovian approach for modeling IS-856 reverse link rate control, 2004, IEEE, 0-7803-8533-0/04, pp. 3236-3240.*

Yeo et al, An Analytical Model for Reverse link rate control in cdma2000 1 EV-DO systems, Mar. 2005, IEEE, vol. 9, No. 3, pp. 270-272.*

*Primary Examiner* — Ian N Moore
*Assistant Examiner* — Jenee Alexander

(57) ABSTRACT

Methods and systems are provided for using the EV-DO Reverse Activity Bit (RAB) to dynamically configure parameters of the EV-DO DRC channel. In an embodiment, an access terminal maintains at least two different DRCLength values in data storage. The access terminal periodically transmits DRC data to an access network on the DRC channel. The DRC data comprises a DRC cover and a DRC value. The access terminal uses the DRC cover to select a serving sector, and the access terminal uses the DRC value to request a forward-link data rate. The access terminal periodically receives from an access node in the access network a RAB having a state that is either set or cleared. The access terminal selects one of the maintained DRCLength values based at least in part on the state of the RAB, and subsequently transmits DRC data according to the selected DRCLength value.

25 Claims, 2 Drawing Sheets

(56) References Cited

U.S. PATENT DOCUMENTS

| | | | |
|---|---|---|---|
| 2007/0058592 A1* | 3/2007 | Kim et al. | 370/335 |
| 2007/0070952 A1* | 3/2007 | Yoon et al. | 370/334 |
| 2007/0091788 A1* | 4/2007 | Rajkotia et al. | 370/209 |
| 2007/0097961 A1* | 5/2007 | Sun et al. | 370/352 |
| 2007/0201438 A1* | 8/2007 | Yoon et al. | 370/352 |
| 2007/0242606 A1* | 10/2007 | Chen | 370/235 |
| 2008/0198813 A1* | 8/2008 | Lu | 370/335 |
| 2009/0268704 A1* | 10/2009 | Kim | 370/342 |

* cited by examiner

USING THE REVERSE ACTIVITY BIT (RAB) TO DYNAMICALLY CONFIGURE PARAMETERS OF THE EV-DO DATA RATE CONTROL (DRC) CHANNEL

BACKGROUND

1. Cellular Wireless Networks and EV-DO Generally

Many people use mobile stations, such as cell phones and personal digital assistants (PDAs), to communicate with cellular wireless networks. These mobile stations and networks typically communicate with each other over a radio frequency (RF) air interface according to a wireless communication protocol such as Code Division Multiple Access (CDMA), perhaps in conformance with one or more industry specifications such as IS-95 and IS-2000. Wireless networks that operate according to these specifications are often referred to as "1xRTT networks" (or "1x networks" for short), which stands for "Single Carrier Radio Transmission Technology." These networks typically provide communication services such as voice, Short Message Service (SMS) messaging, and packet-data communication.

Mobile stations typically conduct these wireless communications with one or more base transceiver stations (BTSs), each of which send communications to and receive communications from mobile stations over the air interface. Each BTS is in turn communicatively connected with an entity known as a base station controller (BSC), which (a) controls one or more BTSs and (b) acts as a conduit between the BTS(s) and one or more switches or gateways, such as a mobile switching center (MSC) and/or packet data serving node (PDSN), which may in turn interface with one or more signaling and/or transport networks.

As such, mobile stations can typically communicate with one or more endpoints over the one or more signaling and/or transport networks from inside one or more coverage areas (such as cells and/or sectors) of one or more BTSs, via the BTS(s), a BSC, and an MSC and/or PDSN. In typical arrangements, MSCs interface with the public switched telephone network (PSTN), while PDSNs interface with one or more core packet-data networks and/or the Internet.

Recently, service providers have introduced mobile stations and wireless networks that communicate using a CDMA protocol known as EV-DO, which stands for "Evolution Data Optimized." EV-DO networks, operating in conformance with one or more releases and/or revisions of industry specification IS-856, provide high rate packet-data service (including Voice over IP (VoIP) service) to mobile stations using a combination of time-division multiplexing (TDM) on the forward link (from the network to mobile stations) and CDMA technology on the reverse link (from mobile stations to the network). Furthermore, some "hybrid" mobile stations can communicate with both EV-DO networks and 1x (and/or WiMax, etc.) networks.

In the EV-DO context, a mobile station is typically referred to as an access terminal, while the network entity with which the access terminal communicates over the air interface is known as an access node. The access node typically includes a device known as a radio network controller (RNC), which is similar to a BSC. The access node also includes one or more BTSs, each including one or more antennas that radiate to define respective wireless coverage areas such as cells and sectors. Note that sectors may be used in the balance of this written description as examples of wireless coverage areas, though this is for explanation and not to the exclusion of cells or other coverage areas. Among other functions, the RNC controls one or more BTSs, and acts as a conduit between the BTSs and a PDSN, which provides access to a packet-data network. Thus, when positioned in a sector provided by an access node, an access terminal may communicate over the packet-data network via the access node and the PDSN.

2. Reverse Noise Rise

In general, in a given sector, an access node can provide service to access terminals on one carrier frequency (i.e. carrier), or on more than one. Furthermore, interference can be, and often is, present on a carrier in a sector. As used herein, an instance of a given carrier in a given sector may be referred to as a sector-carrier. In general, on a sector-carrier, an access node receives transmissions from access terminals operating on that sector-carrier. However, the access node also often receives transmissions on that sector-carrier from other access terminals, other devices, and/or any other sources of interference on that frequency.

At a given moment, the sum total of what an access node is receiving on a given sector-carrier is known as the "reverse noise" on that sector-carrier. At regular intervals, and in fact quite frequently (e.g., once for every forward-link timeslot (i.e. once every approximately 1.67 milliseconds (ms))), access nodes compute a value known as "reverse noise rise" (RNR), which is the difference between (i) the reverse noise that the access node is currently detecting and (ii) a baseline level of reverse noise. Thus, the access node computes how far the reverse noise has risen above that baseline.

To determine the baseline, EV-DO networks typically periodically utilize what is known as a silent interval, which may occur on the order of once every five minutes, and last on the order of 40-100 ms, both of which are typically configurable. During the silent interval, access terminals know not to transmit anything to the access node. The access node can then measure whatever else is out there. As such, the baseline corresponds to the amount of reverse noise when the sector-carrier is unloaded (i.e. without any transmitting access terminals). Note that other reverse-link-noise levels could be used as a baseline.

In general, the lower the RNR is at a given moment, the more favorable the RF conditions are for communication between access terminals and the access node at that moment. Correspondingly, the higher the RNR, the less favorable the RF conditions are. Also, a low RNR generally corresponds to a sector-carrier being lightly loaded, in other words that is supporting communications for a relatively low number of access terminals. A high RNR, as one might expect, generally corresponds to a sector-carrier being heavily loaded, in other words that is supporting communications for a relatively high number of access terminals.

3. Reverse Activity Bit (RAB)

Access nodes typically use the calculated value of RNR to, among other things, set or clear what is known as the Reverse Activity Bit (RAB), which is a value that the access node makes equal to 0 or 1 (i.e. the RAB has two states: set and cleared), and repeatedly transmits on the forward link to all the access terminals operating on a given sector-carrier. Making the RAB equal to 0 (zero) is known as and referred to herein as clearing the RAB, while making the RAB equal to 1 (one) is known as and referred to herein as setting the RAB. As stated, the access node typically calculates RNR at the same frequency at which it transmits forward-link timeslots, or once every 1.67 ms. The access node typically sets or clears the RAB at this same frequency.

With respect to how the access node chooses whether to set or clear the RAB, if the RNR is above a particular threshold (the "RNR threshold"), which is a configurable parameter that may be between 0 dB and 30 dB, as an exemplary range, the access node sets the RAB. If the RNR is below the RNR threshold, the access node clears the RAB. The access node transmits the RAB in a TDM channel—known as the reverse-activity channel—on the forward link. That channel is itself a TDM portion of a forward-link channel known as the Media Access Control (MAC) channel. Note that the RAB is the same for all access terminals on a sector-carrier. The manner in which those access terminals use the value of the RAB is explained below.

4. Access Terminals Using the RAB

The initial release and a subsequent revision of IS-856 are known as Release 0 (Rel. 0) and Revision A (Rev. A), respectively, and are both hereby incorporated herein by reference. The following two subsections respectively relate to how EV-DO access terminals use the RAB in networks that operate according to Rel. 0 and Rev. A. Note that some networks may provide service according to both Rel. 0 and Rev. A.

a. IS-856, Release 0

Under Rel. 0, access terminals can transmit data to access nodes on the reverse link at five different data rates: 9.6 kilobits per second (kbps), 19.2 kbps, 38.4 kbps, 76.8 kbps, and 153.6 kbps. Transmission at these various data rates involves using different types of coding for the data to be transmitted, among other differences. Note that, during a given instance of an access terminal transmitting data to an access node, the access terminal typically starts out using the lowest of those data rates, 9.6 kbps.

Recall that the EV-DO reverse link is essentially a CDMA channel over which the access terminal transmits data to the access node. And the access terminal does so in units of time known as frames, each of which last approximately 26.67 ms, which is the length of time of 16 timeslots on the forward link. And the network is synchronized on CDMA time, such that sets of 16 timeslots on the forward link will be aligned along reverse-link-frame time boundaries.

So, the EV-DO access terminal will transmit its first frame to the access node at 9.6 kbps. And then, for the next frame, the access terminal will stay at that rate, or perhaps transition up to 19.2 kbps. From there, frame by frame for all subsequent frames, the access terminal will transmit at the rate that it is currently using, transition up to the next-higher rate, or transition down to the next-lower rate. Note that rate-setting frequencies other than every frame, such as every other frame or perhaps every four frames, could be used as well.

These (in this example) frame-by-frame decisions to maintain or change the reverse-link data rate are controlled by the RAB and by a table of reverse-link transitional probabilities that are stored by each access terminal. This table is typically sent from the access node to the access terminal during a session-setup process, though it can also be sent (or updated) as new air-interface connections are made between the access node and the access terminal, or perhaps periodically, or perhaps in response to some other event.

The table typically contains eight probabilities, each expressed as an integer between 0 and 255, as explained more fully below. The eight probabilities correspond to the eight possible transitions among the five possible data rates. So, the transitional probabilities correspond to transitioning (in kbps) (1) from 9.6 up to 19.2, (2) from 19.2 up to 38.4, (3) from 38.4 up to 76.8, (4) from 76.8 up to 153.6, (5) from 153.6 down to 76.8, (6) from 76.8 down to 38.4, (7) from 38.4 down to 19.2, and (8) from 19.2 down to 9.6.

Typically, when an access terminal is at the start of transmitting a given frame at a given data rate (say, 38.4 kbps), the access terminal checks the RAB. If the RAB is cleared (i.e. equal to 0), the RNR in the sector is not above the RNR threshold, and thus the access terminal knows that it has two options with respect to the next frame: stay at 38.4 kbps or move up to 76.8 kbps. To determine which of those options the access terminal will take for the next frame, the access terminal generates a random integer between 0 and 255, and compares that random integer with the appropriate transitional probability. In this example, the access terminal would compare the random integer with the 38.4-kbps-to-76.8-kbps value.

If the random integer is less than or equal to the 38.4-kbps-to-76.8-kbps table value, the access terminal will transition up to 76.8 kbps for the next frame. If not, the access terminal will stay at 38.4 kbps for the next frame. The table value is thus a representation of a probability, since the integer that the access terminal compares with the table value is randomly generated. If, say, the table value were 255, the access terminal would have a probability of 1.00 (100%) for moving up to the next-higher data rate; if the table value were 0, the access terminal would only have a 1/256 probability of moving up. And so on.

If the RAB is set (i.e. equal to 1), however, the access node has decided that there is too much reverse noise on the sector-carrier at the moment, and thus the access terminal knows that it has two options with respect to the next frame. Again using 38.4 kbps as an example of the access terminal's current rate, the two options are to stay at 38.4 kbps or move down to 19.2 kbps. To determine which of those options the access terminal will take for the next frame, the access terminal again generates a random integer between 0 and 255, and compares that random integer with the appropriate reverse-link transitional probability. This time, the access terminal would compare the random integer with the 38.4-kbps-to-19.2-kbps value.

As with transitions up to higher data rates, when talking about transitions down to lower data rates, the access terminal checks whether the random integer it generates is less than or equal to the 38.4-to-19.2 table value. If so, the access terminal will transition down to 19.2 kbps for the next frame. If not, the access terminal will stay at 38.4 kbps for the next frame. Again, the table value represents a probability, since the integer that the access terminal compares with the table value is randomly generated. If, the table value were 255, the access terminal would have a probability of 1.00 (100%) for moving down to the next-lower data rate; if the table value were 0, the access terminal would only have a 1/256 probability of moving down. And so on.

b. IS-856, Revision A

As explained above, under Rev. 0, reverse-link data rates are permitted only to increase or decrease by one step at a time (i.e. up to the next-higher data rate or down to the next-lower data rate), controlled by the RAB and the tables of reverse-link transitional probabilities. Under Rev. A, however, a more dynamic, iterative, equation-based approach is utilized, which permits data rates to change more rapidly.

Briefly, under Rev. A, the access node still repeatedly transmits a RAB equal to 0 or 1. Each individual access terminal then uses that value to compute what are known as a Quick Reverse Activity Bit (QRAB) and a Filtered Reverse Activity Bit (FRAB). The QRAB is binary (equal to 0 or 1), while the FRAB is a real number having a value anywhere between −1 and 1 inclusive. The QRAB is a short-term, binary indication of loading: a QRAB of 1 is associated with congestion on the sector-carrier, while a QRAB of 0 is associated with non-congestion. The FRAB is more of a long-term, continuous, historical value, where values closer to −1 indicate a lower degree of congestion on the sector-carrier reverse link, while values closer to 1 indicate a higher degree of congestion on the sector-carrier reverse link. Thus, both the QRAB and the FRAB reflect the access terminal's interpretation of the RAB from the access node.

The access terminal then calculates a value known in Rev. A as "T2PInflow." T2PInflow is an iterative value: prior to each reverse-link transmission, it has a current value, and that current value is one of the inputs in determining its value in the next calculation. Note that the "T2P" prefixes to many of the value and function names in this explanation means "Traffic to Pilot," as one governing principle that drives the determination of reverse-link data rates under Rev. A is the relative values of (1) the power level that the access terminal is using to transmit on the reverse-link portion of the traffic channel and (2) the power level at which the access terminal is detecting the pilot signal from the access node, as is known in the art.

Rev. A defines two functions called "T2PDn(.)" and "T2PUp(.)," both of which are functions of the current T2PInflow, FRAB, and a filtered value of the serving sector pilot strength. If the access terminal sets QRAB to 1 (corresponding to a relatively congested sector-carrier), then T2PInflow will be decremented by the result of T2PDn(.); if, on the other hand, the access terminal sets QRAB to 0 (corresponding to a relatively non-congested sector-carrier), then T2PInflow will be incremented by the result of T2PUp(.). As with all of the details of these computations, the detailed equations can be found in IS-856, Rev. A.

Under Rev. A, this updated T2PInflow value is then used as one of the inputs in what is referred to as a "token bucket" mechanism, which is used to determine a packet size for the next reverse-link transmission. And it is this packet size that essentially determines the reverse-link data rate at which the access terminal will be transmitting, based on a table that correlates packet sizes to data rates. In general, the token bucket mechanism is used as a regulator, to provide data-rate stability over time, while still permitting some instantaneous deviation.

One of the parameters of the token bucket mechanism is the "BucketLevel." Using that value, the updated T2PInflow, and the FRAB, the access terminal calculates a value known as "PotentialT2POutflow." The access terminal also maintains a data queue for outgoing data (i.e. data that is ready and waiting to be transmitted to the access node on the reverse link). The access terminal keeps track of the current size of this data queue in a variable referred to here as the "data queue size." The access terminal determines the packet size for the next transmission based on PotentialT2POutflow, the data queue size, other constraints and maximum/minimum allowed values, and the access terminal's transmission power.

As stated, the computed packet size essentially determines the reverse-link data rate, which, under Rev. A, can range from 19.2 kbps up to 1.84 megabits per second (Mbps). As a final part of the calculation, the access terminal computes a value known as "T2POutflow" (also referred to as "actual T2POutflow") based on the computed packet size. The access terminal then updates the BucketLevel with the updated T2PInflow value and the newly-calculated (actual) T2POutflow value, so that the BucketLevel will be ready for the next iteration.

OVERVIEW

Thus, the RAB is a sector-carrier-wide parameter transmitted on the forward link to all access terminals operating on a sector-carrier. The typical use of the RAB is to regulate RNR by regulating reverse-link data rates of access terminals, which receive the RAB and responsively process it in a manner that depends on their implemented version of IS-856, as described above.

Another EV-DO concept relevant to the present disclosure is known as Data Rate Control (DRC). In EV-DO, at a given time, an access terminal may have multiple sectors in what is known as its active set; on a frequent and periodic (e.g. slot-by-slot) basis, the access terminal uses a reverse-link channel known as the DRC channel to select one of the sectors in its active set to serve the access terminal with data on the forward link; in EV-DO networks, an access terminal receives data on the forward link from only one sector (known with respect to that access terminal as the serving sector) at a time.

Access terminals transmit at least two values on the DRC channel: a DRC cover and a DRC value (which are at times collectively referred to herein as "DRC data"). The DRC cover identifies the sector that the access terminal has selected to be (i.e. is requesting to be) its serving sector, while the DRC value corresponds to a forward-link data rate that is being requested by the access terminal. In particular, DRC values in IS-856, Rel. 0 represent actual data rates, while DRC values in IS-856, Rev. A correspond to what are known as packet transmission formats, each associated with a given data rate. The selected sector then serves the access terminal at that forward-link data rate if possible.

One key parameter that governs operation of the DRC channel is known as DRCLength, which dictates both (1) how often the access terminal updates (i.e. changes or decides to keep the same values for) its DRC data and (2) how many reverse-link slots the access terminal uses to convey its DRC data each time. In general, values for DRCLength run from 1 to 8, inclusive. In conventional EV-DO implementations, during session setup, the access node sends a value for the access terminal to use for DRCLength, and the access terminal statically uses that value for the entire duration of the session.

In a usual implementation, an access terminal measures the signal-to-noise ratio (SINR) of the pilot channel of each sector in its active set and updates its DRC data (typically to select the sector with the best SINR as the serving sector) at a frequency of 600/DRCLength times per second; thus, if DRCLength is 1, the frequency would be 600 times per second (and each transmission of the DRC data would use only 1 timeslot), whereas if DRCLength were 8, the frequency would be 75 times per second (and each transmission of the DRC data would use 8 timeslots). Thus, according to typical EV-DO implementations, an access terminal may update its DRC data as frequently as once every slot or as infrequently as once every 8 slots.

In general, low values for DRCLength result in better throughput on the forward link in slow-fading conditions, but also result in the DRC channel being less robust (i.e. an increased number of errors in conveying requested data rates to the access network, typically translating into more packet errors on the forward link). On the other hand, high values for DRCLength result in lower throughput on the forward link in slow-fading conditions, but also result in the DRC channel being more robust (i.e. a decreased number of errors in conveying requested data rates to the access network, typically translating into fewer packet errors on the forward link).

Furthermore, the value for DRCLength is related to another parameter that impacts the operation of the DRC channel in EV-DO networks: DRCChannelGain, which determines the transmit power of the DRC channel with reference to the power of the access terminal's reverse pilot channel. The units of DRCChannelGain are decibels (dB), and are typically adjustable in steps of 0.5 dB; so, as examples, a DRCChannelGain of 0 would mean that the two power levels would be equal, while a DRCChannelGain of −3 would mean that the DRC channel would be transmitted at half the power of the reverse pilot channel, and so on. If too low a value of DRCChannelGain is used, the performance of the DRC channel may be degraded (i.e. it may be difficult for the access node to decode the DRC data). If too high a value of DRCChannelGain is used, however, unnecessary reverse-link interference is generated, and thus capacity on the reverse link is negatively impacted, and the RAB may be triggered (i.e. set), which would tend to decrease reverse-link data rates; and there may be other problems.

In current EV-DO implementations, the values of DRCLength and DRCChannelGain are typically inversely related, such that a high value for one would mean a low value for the other, and a low value for one would mean a high value for the other. So, a low number of slots (i.e. a low DRCLength) is typically associated with a higher level of transmission power (i.e. a high DRCChannelGain), while a high number of slots (i.e. a high DRCLength) is typically associated with a lower level of transmission power (i.e. a low DRCChannelGain). Again, in current EV-DO implementations, static values for DRCLength and DRCChannelGain are used.

The present methods and systems arise in part from a realization that it is not necessary to maintain an inverse relationship between DRCLength and DRCChannelGain. In general, lower values of each are associated with the DRC channel being less reliably decoded by the access node, while higher values of each are associated with the DRC channel being more reliably decoded by the access node. And, generally speaking, the more reliably received and decoded the DRC channel is by the access node, the better the service will be to the access terminal on the forward link. Thus, higher values for one or both should be used when that will not cause other problems. Thus, better forward-link performance can be realized when reverse-link conditions are favorable, and reverse-link conditions can be mitigated in times where they are unfavorable.

Thus, in accordance with the present methods and systems, the values of DRCLength and/or DRCChannelGain are dynamically adjusted based on the RAB. When the RAB is cleared, this typically means that the sector-carrier's reverse-link conditions are favorable; in this circumstance, one or both of DRCLength and DRCChannelGain are dynamically increased for the sector-carrier, in order to improve forward-link performance. Conversely, when the RAB is set, this typically means that the sector-carrier's reverse-link conditions are not favorable; in this circumstance, one or both of DRCLength and DRCChannelGain are dynamically decreased for the sector-carrier, in order to improve reverse-link performance.

In an embodiment, an access node may, at session setup and/or at another time, transmit two values for DRCLength (i.e. a low DRCLength and a high DRCLength) and/or two values for DRCChannelGain (i.e. a low DRCChannelGain and a high DRCChannelGain) to one or more access terminals. In an embodiment, an access node may increase or decrease one or both of these parameters on a given sector-carrier by broadcasting a new value for one or both parameters on a system parameters message, or other suitable message, though many possible implementations exist for conveying this information to access terminals operating on the sector-carrier. In an embodiment, access terminals may be provisioned with such values.

In an embodiment, an access terminal may use the low DRCLength when the RAB is set. In an embodiment, an access terminal may use the high DRCLength when the RAB is clear. In an embodiment, an access terminal may use the low DRCChannelGain when the RAB is set. In an embodiment, an access terminal may use the high DRCChannelGain when the RAB is clear. And any combination of these possibilities may be used as well. For example, an access terminal may use both the low DRCLength and the low DRCChannelGain when the RAB is set, and may use both the high DRCLength and the high DRCChannelGain when the RAB is clear. And certainly other permutations and combination exist as well.

In an embodiment, an access node may change the sector-wide value(s) for DRCLength and/or DRCChannelGain only when the RAB has held the same value (either 0 or 1) for a sufficient number of consecutive timeslots (or other time periods). Similarly, in an embodiment, an access terminal may change the value it uses for DRCLength and/or DRCChannelGain only when the RAB has held the same value (either 0 or 1) for a sufficient number of consecutive timeslots (or other time periods). And other possibilities exist as well.

And it should be noted that the above overview is illustrative and not limiting. That is, additional and/or different features may be present in some embodiments. It should be noted as well that any description of an access terminal or an access node operating according to any particular protocol such as EV-DO is by way of example, and that any suitable protocol(s) may be used instead, such as 1xRTT CDMA, iDEN, TDMA, AMPS, GSM, GPRS, UMTS, EDGE, WiMax (e.g. IEEE 802.16), LTE, microwave, satellite, MMDS, Wi-Fi (e.g. IEEE 802.11), Bluetooth, infrared, and/or any other now known or later developed.

BRIEF DESCRIPTION OF THE DRAWINGS

Various exemplary embodiments are described herein with reference to the following drawings, wherein like numerals denote like entities.

DETAILED DESCRIPTION OF EXEMPLARY EMBODIMENTS

1. Exemplary Architecture

Figure 1:
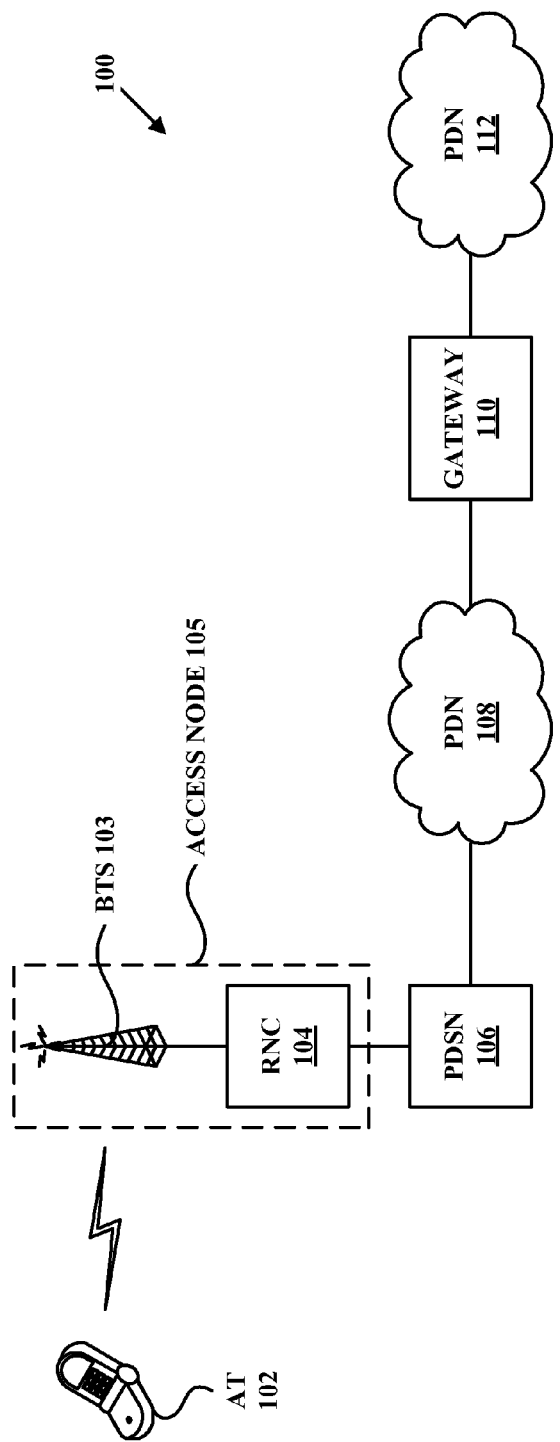
FIG. 1 depicts a communication system, in accordance with exemplary embodiments.

FIG. 1 is a simplified block diagram of a communication system, in accordance with exemplary embodiments. It should be understood that this and other arrangements described herein are set forth only as examples. Those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. Various functions may be carried out by a processor executing instructions stored in memory.

As shown in FIG. 1, a communication system 100 includes an access terminal (AT) 102, an access node 105 (shown as comprising a BTS 103 and an RNC 104), a PDSN 106, a packet-data network (PDN) 108, a gateway 110, and a PDN 112. And additional entities not depicted could be present as well. For example, there could be more than one access terminal in communication with access node 105; also, there could be additional entities in communication with PDN 108 and/or PDN 112. Also, there could be one or more routers, switches, other devices and/or networks making up at least part of one or more of the communication links.

Access terminal 102 may be any device arranged to carry out the access-terminal functions described herein, and may include a user interface, a wireless-communication interface, a processor, and data storage comprising instructions executable by the processor for carrying out those access-terminal functions. The user interface may include buttons, a touchscreen, a microphone, and/or any other elements for receiving inputs from users, as well as a speaker, one or more displays, and/or any other elements for communicating outputs to users.

The wireless-communication interface may comprise an antenna and a chipset for communicating with one or more base stations over an air interface. As an example, the chipset could be one suitable for engaging in EV-DO communications, including IS-856, Rel. 0 and/or IS-856, Rev. A communications. The chipset or wireless-communication interface in general may also be able to communicate with a 1xRTT CDMA network, a Wi-Fi (IEEE 802.11) network, a WiMax network, and/or one or more additional types of wireless networks. The processor and data storage may be any suitable components known to those of skill in the art. As examples, access terminal 102 could be or include a cell phone, a PDA, a laptop computer, a hybrid IS-2000 (or WiMax, etc.)/IS-856 device, and/or a multi-mode Wi-Fi/cellular device.

BTS 103 may be any one or any combination of network elements arranged to carry out the BTS functions described herein, and may include a communication interface, a processor, and data storage comprising instructions executable by the processor to carry out those BTS functions. The communication interface may include one or more antennas and chipsets or other components for providing one or more coverage areas such as cells or sectors according to a protocol such as CDMA, EV-DO, WiMax, or any other suitable protocol. The communication interface may also include a wired or wireless packet-data interface (which may be characterized as a backhaul connection), such as an Ethernet interface, for communicating with RNC 104.

RNC 104 may be any one or any combination of network elements arranged to carry out the RNC functions described herein. As such, RNC 104 may include a communication interface, a processor, and data storage comprising instructions executable by the processor to carry out those RNC functions. The communication interface may include a wired or wireless packet-data interface (which may be characterized as a backhaul connection), such as an Ethernet interface, for communicating directly or over one or more networks with PDSN 106. In general, RNC 104 functions to control one or more BTSs, and to serve as a conduit between the one or more BTSs and PDSN 106, enabling access terminals to communicate over PDN 108 and perhaps beyond.

Note that access node 105 may comprise BTS 103 and RNC 104, and may comprise one or more additional BTSs as well. In general, access node 105 provides wireless service to access terminals over an air interface, and uses a backhaul connection to provide transport service over PDN 108 (or perhaps PDN 108 and PDN 112) to those access terminals.

In an embodiment, access node 105 may operate in compliance with at least one of IS-856, Release 0 and IS-856, Revision A. Furthermore, as explained herein with respect to BTS 103 and RNC 104, access node 105 may comprise a communication interface, a processor, and data storage. Furthermore, the data storage may contain instructions executable by the processor for maintaining in the data storage a low DRCLength value and a high DRCLength value, wherein the low DRCLength value is less than the high DRCLength value.

The data storage may further contain instructions executable by the processor for periodically receiving DRC data on DRC channels from access terminals, where each instance of DRC data comprises a DRC cover and a DRC value, where the access terminals use the DRC covers to select serving sectors, and where the access terminals use the DRC values to request forward-link data rates. The data storage may further contain instructions executable by the processor for periodically transmitting a (set or cleared) RAB to the access terminals.

The data storage may further contain instructions executable by the processor for selecting one of the maintained DRCLength values based at least in part on the state of the RAB, and subsequently transmitting the selected DRCLength value to the access terminals for use by the access terminals in transmitting the DRC data according to the selected DRCLength value, where selecting one of the maintained DRCLength values based at least in part on the state of the RAB comprises (i) selecting the high DRCLength value when the RAB is cleared for at least a first number of consecutive RAB transmissions, and (ii) selecting the low DRCLength value when the RAB is set for at least a second number of consecutive RAB transmissions. (Note that the first number could be equal or not equal to the second number.)

PDSN 106 may be any networking server or other device arranged to carry out the PDSN functions described herein. PDSN 106 may include a communication interface, a processor, and data storage comprising instructions executable by the processor for carrying out those PDSN functions. The communication interface may include a wired packet-data interface such as an Ethernet interface for communicating with access node 105 and/or over PDN 108. Note that PDSN 106 may, instead or in addition, comprise a wireless-communication interface for communicating with access node 105 and/or over PDN 108. Note also that PDSN 106 may use the same interface or separate interfaces for communicating with access node 105 and for communicating over PDN 108. PDSN 106 may generally function to provide access node 105 with access to PDN 108, and vice versa.

Each of PDN 108 and PDN 112 may include one or more wide area networks, one or more local area networks, one or more public networks such as the Internet, one or more private networks, one or more wired networks, one or more wireless networks, and/or one or more networks of any other type. Devices in communication with PDN 108 and/or PDN 112 may exchange data using a packet-switched protocol such as IP, and may be identified by an address such as an IP address. In this example, PDN 108 is the service provider's privately-operated IP network (where the service provider may operate at least access node 105 and PDSN 106), while PDN 112 is the Internet. However, this is for illustration and not by way of limitation. In some embodiments, PDSN 106 may connect directly to the Internet, in which case PDN 108 and gateway 110 may not be necessary. And other configurations are certainly possible as well.

Gateway 110 may be any networking server or other device arranged to carry out the gateway functions described herein. Thus, gateway 110 may include a communication interface, a processor, and data storage comprising instructions executable by the processor for carrying out those gateway functions. The communication interface may include a wired packet-data interface, such as an Ethernet interface, for communicating over PDN 108 and/or PDN 112. Note that gateway 110 may, instead or in addition, comprise a wireless-communication interface for communicating over PDN 108 and/or PDN 112. Gateway 110 may use the same interface or separate interfaces for communicating over PDN 108 and/or PDN 112. Gateway 110 may generally function to provide PDN 108 and PDN 112 with connectivity to each other.

2. Exemplary Operation

Figure 2:
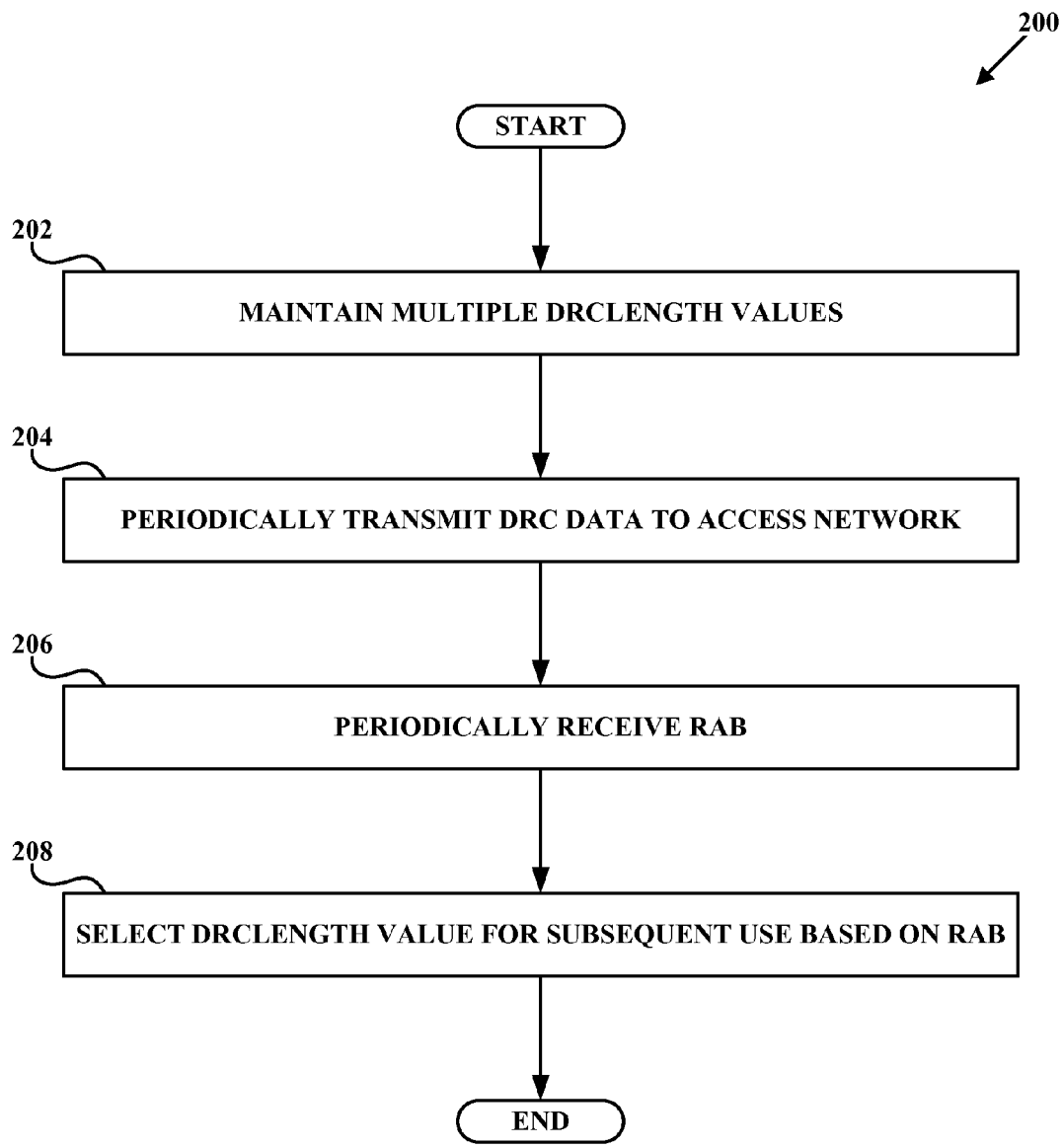
FIG. 2 depicts a flowchart of a method, in accordance with exemplary embodiments.

FIG. 2 depicts an exemplary method that may be carried out by an access terminal, such as access terminal 102, which may operate in compliance with at least one of IS-856, Release 0 and IS-856, Revision A. Although method 200 is described herein as being carried out by access terminal 102, method 200 may, in some embodiments, be carried out by an access terminal in cooperation with one or more entities described herein, and/or one or more other entities.

At step 202, access terminal 102 maintains at least two different DRCLength values in data storage. In an embodiment, this may mean maintaining two DRCLength values: a low DRCLength value and a high DRCLength value, where the low DRCLength value (such as 1) is less than the high DRCLength value (such as 8). In an embodiment, access terminal 102 may receive these values from the access network, perhaps during session setup.

At step 204, access terminal 102 periodically transmits DRC data to the access network on the DRC channel. The DRC data includes a DRC cover (for selecting a serving sector) and a DRC value (for requesting a forward-link data rate).

At step 206, access terminal 102 periodically receives from access node 105 in the access network a RAB that has a state that is either set or cleared. Note that, in addition to the uses of the RAB disclosed herein, access terminal 102 may determine a reverse-link data rate for itself based at least in part on the state of the RAB, as described above.

At step 208, access terminal 102 selects one of the maintained DRCLength values based at least in part on the state of the RAB, and subsequently transmits DRC data according to the selected DRCLength value. This may involve (i) selecting the high DRCLength value when the RAB is cleared and (ii) selecting the low DRCLength value when the RAB is set. In an embodiment, this may involve (i) selecting the high DRCLength value when the RAB is cleared for at least a first number of consecutive RAB transmissions, and (ii) selecting the low DRCLength value when the RAB is set for at least a second number (that could be equal to or not equal to the first number) of consecutive RAB transmissions.

In an embodiment, access terminal 102 may maintain at least two DRCChannelGain values in data storage, and select one of those values based at least in part on the state of the RAB, and subsequently transmitting DRC data according to the selected DRCChannelGain value. In an embodiment, this may mean maintaining a low DRCChannelGain value and a high DRCChannelGain value, where the low value is less than the high value. As such, access terminal 102 may (i) select the high DRCChannelGain value when the RAB is cleared and (ii) select the low DRCChannelGain value when the RAB is set. In an embodiment, access terminal 102 may receive the low DRCChannelGain value and the high DRCChannelGain value from the access network, perhaps during session setup.

3. Conclusion

Various exemplary embodiments have been described above. Those skilled in the art will understand, however, that changes and modifications may be made to those examples without departing from the scope of the claims.

The invention claimed is:

1. A method comprising:
an access terminal maintaining at least two different DRCLength values in data storage;
the access terminal periodically transmitting data rate control (DRC) data to an access network on a DRC channel, wherein the DRC data comprises a DRC cover and a DRC value, wherein the access terminal uses the DRC cover to select a serving sector, and wherein the access terminal uses the DRC value to request a forward-link data rate;
the access terminal periodically receiving from an access node in the access network a reverse activity bit (RAB), the RAB having a state that is either set or cleared; and
the access terminal selecting one of the maintained DRCLength values based at least in part on the state of the RAB, and subsequently transmitting DRC data according to the selected DRCLength value.

2. The method of claim 1, wherein the access terminal operates in compliance with at least one of IS-856, Release 0 and IS-856, Revision A.

3. The method of claim 1, further comprising:
the access terminal maintaining at least two different DRCChannelGain values in data storage; and
the access terminal selecting one of the maintained DRCChannelGain values based at least in part on the state of the RAB, and subsequently transmitting DRC data according to the selected DRCChannelGain value.

4. The method of claim 1, wherein the at least two different DRCLength values consist of a low DRCLength value and a high DRCLength value, wherein the low DRCLength value is less than the high DRCLength value.

5. The method of claim 4, wherein the low DRCLength value is 1.

6. The method of claim 4, wherein the high DRCLength value is 8.

7. The method of claim 4, wherein selecting one of the maintained DRCLength values based at least in part on the state of the RAB comprises (i) selecting the high DRCLength value when the RAB is cleared and (ii) selecting the low DRCLength value when the RAB is set.

8. The method of claim 4, wherein selecting one of the maintained DRCLength values based at least in part on the state of the RAB comprises (i) selecting the high DRCLength value when the RAB is cleared for at least a first number of consecutive RAB transmissions, and (ii) selecting the low DRCLength value when the RAB is set for at least a second number of consecutive RAB transmissions.

9. The method of claim 8, wherein the first number is equal to the second number.

10. The method of claim 8, wherein the first number is not equal to the second number.

11. The method of claim 4, further comprising the access terminal receiving the low DRCLength value and the high DRCLength value from the access network.

12. The method of claim 11, wherein the access terminal receives the low DRCLength value and the high DRCLength value from the access network during session setup.

13. The method of claim 4, further comprising:
the access terminal maintaining at least two different DRCChannelGain values in data storage, wherein the at least two different DRCChannelGain values consist of a low DRCChannelGain value and a high DRCChannelGain value, wherein the low DRCChannelGain value is less than the high DRCChannelGain value; and the access terminal selecting one of the maintained DRC-ChannelGain values based at least in part on the state of the RAB, and subsequently transmitting DRC data according to the selected DRCChannelGain value.

14. The method of claim 13, wherein selecting one of the maintained DRCChannelGain values based at least in part on the state of the RAB comprises (i) selecting the high DRC-ChannelGain value when the RAB is cleared and (ii) selecting the low DRCChannelGain value when the RAB is set.

15. The method of claim 13, further comprising the access terminal receiving the low DRCChannelGain value and the high DRCChannelGain value from the access network.

16. The method of claim 15, wherein the access terminal receives the low DRCChannelGain value and the high DRC-ChannelGain value from the access network during session setup.

17. The method of claim 1, further comprising the access terminal determining a reverse-link data rate for the access terminal based at least in part on the state of the RAB.

18. An access terminal that operates in compliance with at least one of IS-856, Release 0 and IS-856, Revision A, the access terminal comprising:
a communication interface;
a processor; and
data storage comprising instructions executable by the processor for:
maintaining at least two different DRCLength values in the data storage;
periodically transmitting data rate control (DRC) data to an access network on a DRC channel, wherein the DRC data comprises a DRC cover and a DRC value, wherein the access terminal uses the DRC cover to select a serving sector, and wherein the access terminal uses the DRC value to request a forward-link data rate;
periodically receiving from an access node in the access network a reverse activity bit (RAB), the RAB having a state that is either set or cleared; and
selecting one of the maintained DRCLength values based at least in part on the state of the RAB, and subsequently transmitting DRC data according to the selected DRCLength value.

19. The access terminal of claim 18, wherein the data storage further comprises instructions executable by the processor for:
maintaining at least two different DRCChannelGain values in the data storage; and
selecting one of the maintained DRCChannelGain values based at least in part on the state of the RAB, and subsequently transmitting DRC data according to the selected DRCChannelGain value.

20. The access terminal of claim 18, wherein the at least two different DRCLength values consist of a low DRCLength value and a high DRCLength value, wherein the low DRCLength value is less than the high DRCLength value.

21. The access terminal of claim 20, wherein the instructions for selecting one of the maintained DRCLength values based at least in part on the state of the RAB comprise instructions for (i) selecting the high DRCLength value when the RAB is cleared and (ii) selecting the low DRCLength value when the RAB is set.

22. The access terminal of claim 20, wherein the instructions for selecting one of the maintained DRCLength values based at least in part on the state of the RAB comprise instructions for (i) selecting the high DRCLength value when the RAB is cleared for at least a first number of consecutive RAB transmissions, and (ii) selecting the low DRCLength value when the RAB is set for at least a second number of consecutive RAB transmissions.

23. The access terminal of claim 20, wherein the data storage further comprises instructions executable by the processor for:
maintaining at least two different DRCChannelGain values in the data storage, wherein the at least two different DRCChannelGain values consist of a low DRCChannelGain value and a high DRCChannelGain value, wherein the low DRCChannelGain value is less than the high DRCChannelGain value; and
selecting one of the maintained DRCChannelGain values based at least in part on the state of the RAB, and subsequently transmitting DRC data according to the selected DRCChannelGain value.

24. The access terminal of claim 23, wherein the instructions for selecting one of the maintained DRCChannelGain values based at least in part on the state of the RAB comprise instructions for (i) selecting the high DRCChannelGain value when the RAB is cleared and (ii) selecting the low DRCChannelGain value when the RAB is set.

25. An access node that operates in compliance with at least one of IS-856, Release 0 and IS-856, Revision A, the access node comprising:
a communication interface;
a processor; and
data storage comprising instructions executable by the processor for:
maintaining in the data storage a low DRCLength value and a high DRCLength value, wherein the low DRCLength value is less than the high DRCLength value;
periodically receiving data rate control (DRC) data on DRC channels from access terminals, wherein each instance of DRC data comprises a DRC cover and a DRC value, wherein the access terminals use the DRC covers to select serving sectors, and wherein the access terminals use the DRC values to request forward-link data rates;
periodically transmitting a reverse activity bit (RAB) to the access terminals, the RAB having a state that is either set or cleared; and
selecting one of the maintained DRCLength values based at least in part on the state of the RAB, and subsequently transmitting the selected DRCLength value to the access terminals for use by the access terminals in transmitting the DRC data according to the selected DRCLength value,
wherein selecting one of the maintained DRCLength values based at least in part on the state of the RAB comprises (i) selecting the high DRCLength value when the RAB is cleared for at least a first number of consecutive RAB transmissions, and (ii) selecting the low DRCLength value when the RAB is set for at least a second number of consecutive RAB transmissions.

* * * * *